(12) United States Patent
Cui et al.

(10) Patent No.: US 7,149,909 B2
(45) Date of Patent: Dec. 12, 2006

(54) POWER MANAGEMENT FOR AN INTEGRATED GRAPHICS DEVICE

(75) Inventors: Ying Cui, Mountain View, CA (US);
Eric C. Samson, Folsom, CA (US);
Ariel Berkovits, Sacramento, CA (US);
Aditya Navale, El Dorado Hills, CA (US); David A. Wyatt, San Jose, CA (US); Leslie E. Cline, Sunnyvale, CA (US); Joseph W. Tsang, Elk Grove, CA (US); Mark A. Blake, San Jose, CA (US); David I. Poisner, Folsom, CA (US); William A. Stevens, Folsom, CA (US); Vijay R. Sar-Dessai, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 10/143,406

(22) Filed: May 9, 2002

(65) Prior Publication Data
US 2003/0210247 A1    Nov. 13, 2003

(51) Int. Cl.
*G06F 1/32* (2006.01)
(52) U.S. Cl. ............... 713/322; 345/519; 713/501
(58) Field of Classification Search ............ 345/519; 713/322, 501
See application file for complete search history.

(56) References Cited

U.S. PATENT DOCUMENTS

| 4,238,784 A | 12/1980 | Keen et al. |
| 4,825,337 A | 4/1989 | Karpman |
| 4,841,440 A | 6/1989 | Yonezu et al. |
| 5,021,679 A | 6/1991 | Fairbanks et al. |
| 5,134,398 A | 7/1992 | Yasutake et al. |
| 5,153,535 A | 10/1992 | Fairbanks et al. |
| 5,254,992 A | 10/1993 | Keen et al. |
| 5,307,003 A | 4/1994 | Fairbanks et al. |
| 5,369,771 A | 11/1994 | Gettel |
| 5,381,043 A | 1/1995 | Kohiyama et al. |
| 5,478,221 A | 12/1995 | Loya |
| 5,537,343 A | 7/1996 | Kikinis et al. |
| 5,550,710 A | 8/1996 | Rahamim et al. |
| 5,598,537 A | 1/1997 | Swanstrom et al. |
| 5,598,539 A | 1/1997 | Gephardt et al. |
| 5,603,036 A | 2/1997 | Wells et al. |

(Continued)

FOREIGN PATENT DOCUMENTS

EP    0 474 963 A3    3/1992

(Continued)

OTHER PUBLICATIONS

ATI Technologies, "POWERPLAY White Paper", Printed Aug. 2001.*

(Continued)

*Primary Examiner*—Thomas Lee
*Assistant Examiner*—Albert Wang
(74) *Attorney, Agent, or Firm*—Cynthia Thomas Faatz

(57) ABSTRACT

In one embodiment of the invention, an integrated device is described that employs a mechanism to control power consumption of a graphics memory controller hub (GMCH) through both voltage and frequency adjustment of clock signal received from a clock generator. The GMCH comprises a graphics core and a circuit to alter operational behavior, such as the frequency of a render clock signal supplied to the graphics core. The circuit is adapted to monitor idleness of the graphics core and reduce a frequency level of the render clock signal if the idleness exceeds a determined percentage of time.

18 Claims, 12 Drawing Sheets

U.S. PATENT DOCUMENTS

| | | |
|---|---|---|
| 5,625,829 A | 4/1997 | Gephardt et al. |
| 5,627,412 A | 5/1997 | Beard |
| 5,648,762 A | 7/1997 | Ichimura et al. |
| 5,664,118 A | 9/1997 | Nishigaki et al. |
| 5,696,977 A | 12/1997 | Wells et al. |
| 5,721,837 A | 2/1998 | Kikinis et al. |
| 5,745,041 A | 4/1998 | Moss |
| 5,745,375 A | 4/1998 | Reinhardt et al. |
| 5,752,011 A | 5/1998 | Thomas et al. |
| 5,760,636 A | 6/1998 | Noble et al. |
| 5,781,783 A | 7/1998 | Gunther et al. |
| 5,798,951 A | 8/1998 | Cho et al. |
| 5,884,049 A | 3/1999 | Atkinson |
| 5,930,110 A | 7/1999 | Nishigaki et al. |
| 5,974,556 A | 10/1999 | Jackson et al. |
| 5,974,557 A | 10/1999 | Thomas et al. |
| 5,987,614 A | 11/1999 | Mitchell et al. |
| 6,018,803 A | 1/2000 | Kardach |
| 6,125,450 A | 9/2000 | Kardach |
| 6,216,235 B1 | 4/2001 | Thomas et al. |
| 6,275,945 B1 | 8/2001 | Tsuji et al. |
| 6,292,201 B1 | 9/2001 | Chen et al. |
| 6,397,343 B1 * | 5/2002 | Williams et al. ............ 713/501 |
| 6,407,595 B1 * | 6/2002 | Huang et al. ............... 327/114 |
| 6,460,125 B1 * | 10/2002 | Lee et al. .................... 711/167 |
| 6,480,198 B1 * | 11/2002 | Kang .......................... 345/519 |
| 6,487,668 B1 | 11/2002 | Thomas et al. |
| 6,601,179 B1 | 7/2003 | Jackson et al. |
| 6,715,089 B1 * | 3/2004 | Zdravkovic ................. 713/322 |
| 6,848,058 B1 * | 1/2005 | Sinclair et al. ............. 713/322 |

FOREIGN PATENT DOCUMENTS

| | | |
|---|---|---|
| EP | 0 539 884 A1 | 5/1993 |
| EP | 0 566 395 A1 | 10/1993 |
| EP | 0 632 360 A1 | 1/1995 |
| WO | WO 0173529 A2 | 4/2001 |
| WO | WO 0173534 A2 | 4/2001 |

OTHER PUBLICATIONS

Charles P. Schultz "Dynamic Clock Control For Microprocessor System Energy Mangement", Motorola Inc., Technical Developments, vol. 14, Dec. 1991, pp. 53-54, Schaumburg, IL.

"Dynamic Power Managment By Clock Speed Variation", IBM Technical Disclosure Bulletin, vol. 32, No. 8B, Jan. 1990, pp. 373, Armonk, NY.

IPEA/US, Written Opinion for International Application No. PCT/US03/10428, 7 pages, Apr. 29, 2005.

* cited by examiner

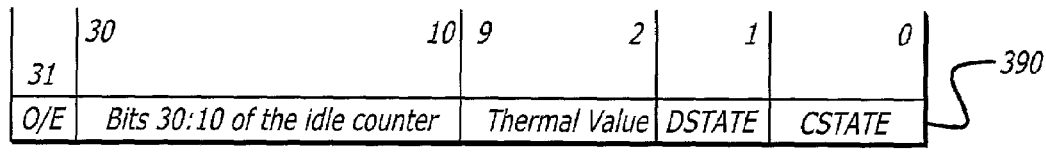

FIG. 5A

| BIT | DESCRIPTION |
|---|---|
| 31 | ENABLE THE IDLE MONITOR |
| 30 | ENABLE HW TRANSITION (EN_HW_TRAN) |
| 29 | SWITCH_TO_SLOW_IF_HOT |
| 28 | SW RESET TO SLOW ( ONLY BECOME EFFECTIVE IF EN_HW_TRAN IS DISABLED ) <br> 0 -SET TO FAST STATE <br> 1 - SET TO SLOW STATE |
| 27 | RESERVED |
| 26 | WRITE TO THE IDLE STATUS PAGE (ISP) REGISTER |
| 25:12 | RESERVED |
| 11 | MASK MPEG DONE SIGNAL ( 0- UNMASKED, 1 - MASKED) |
| 10 | MASK HB DONE SIGNAL ( 0 - UNMASKED, 1 - MASKED) |
| 9 | MASK BLT DONE SIGNAL ( 0 - UNMASKED, 1 - MASKED) |
| 8 | MASK 3D DONE SIGNAL ( - UNMASKED, 1 - MASKED) |
| 7:2 | RESERVED |
| 1 | STATE (RO) - DESIRED STATE (INDICATE RENDER CLOCK DESIRED FREQUENCY) |
| 0 | STATE (RO) - DESIRED STATE (INDICATE RENDER CLOCK CURRENT FREQUENCY) |

FIG. 5B

POWER MANAGEMENT FOR AN INTEGRATED GRAPHICS DEVICE

FIELD

Embodiments of the invention relate to the field of power management, in particular, to scaling power consumption by a graphics controller based on events such as demand and load for example.

GENERAL BACKGROUND

Over the last few years, there have been many advances in semiconductor technology which have resulted in the development of improved graphic controllers operating at higher frequencies and supporting additional and/or enhanced features. While these advances have enabled hardware manufacturers to design and build faster and more sophisticated graphics cards and computers, they also pose a disadvantage to battery-powered laptop and handheld computers. In particular, these battery-powered computers consume more power and dissipate more heat as a by-product than those past generation computers.

Within a graphics memory controller hub for example, a graphic core is one of its major functional blocks having a large gate count. Hence, power consumption by the graphics memory controller hub is primarily correlated to the voltage and frequency applied to the graphics core. Namely, as the graphics core voltage increases, the power consumed by the graphics memory controller hub increases as well. Since utilization of the graphics core can vary significantly from application to application, computers are unnecessarily wasting power when supplying high voltages and frequency signaling to the graphics core to process applications having minimal graphics. This will unnecessarily reduce battery life of laptop and hand-held computers as well as cause these computers to operate at unnecessarily high temperatures.

BRIEF DESCRIPTION OF THE DRAWINGS

The invention may best be understood by referring to the following description and accompanying drawings that are used to illustrate embodiments of the invention.

FIG. 5A is an exemplary embodiment of an Idle Status Page (ISP) register used by the activity control circuit of FIG. 4.

FIG. 5B is an exemplary embodiment of an Idle Control and Status (ICS) register used by the activity control circuit of FIG. 4.

DETAILED DESCRIPTION

In general, various embodiments of the invention describe a apparatus and method for controlling power consumption by an electronic device through both voltage and frequency adjustment. As one embodiment, this voltage and frequency control is applied to a graphics memory controller hub (GMCH).

The following detailed description is presented largely in terms of block diagrams and flowcharts to collectively illustrate embodiments of the invention. Well-known circuits or process operations are not discussed in detail to avoid unnecessarily obscuring the understanding of this description.

Certain terminology is used to describe certain features of the invention. For example, a ""computing device"" may be any electronic product having a graphics memory controller hub such as a computer (e.g., desktop, laptop, hand-held, server, mainframe, etc.), or perhaps a set-top box, consumer electronic equipment (e.g., television), game console, or the like.

Normally, the computing device comprises internal logic, namely hardware, firmware, software module(s) or any combination thereof. A ""software module"" is a series of instructions that, when executed, performs a certain function. Examples of a software module include an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, or the like. The terms ""logic High"" and ""asserted"" (or any tense thereof) means placement of a signal into a first state, perhaps above or below a certain voltage. The terms ""Logic Low"" and ""deasserted"" (or any tense thereof) means placement of a signal into a new state different than the first state.

I. General Architecture

Figure 1:
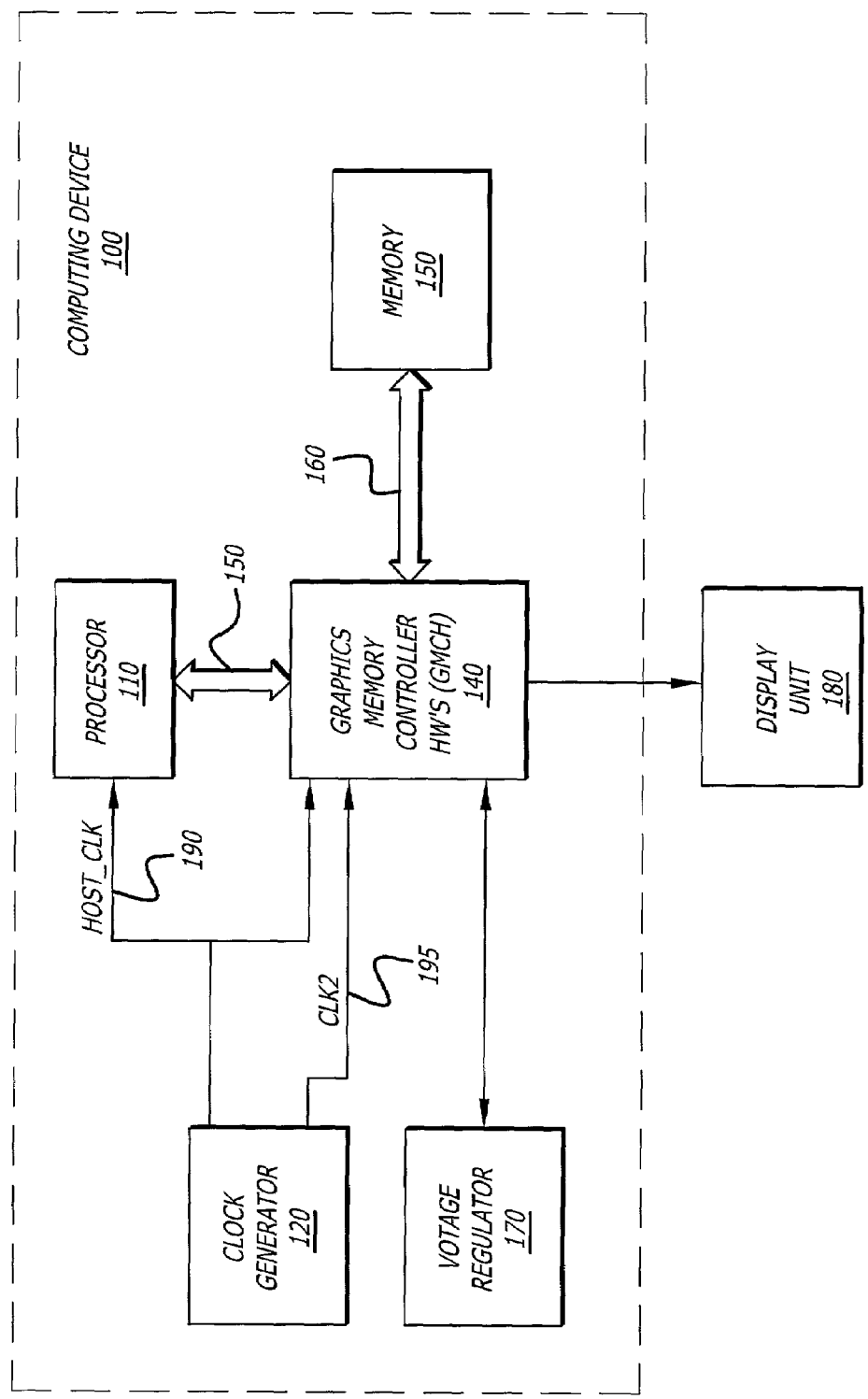
FIG. 1 is an exemplary embodiment of logic employed within a computing device.

Referring to FIG. 1, an exemplary embodiment of circuitry employed within a computing device 100 is shown. The computing device 100 comprises a processor 110, a clock generator 120, a memory 130 and an integrated device 140 such as a graphics memory controller hub (GMCH) for example. The GMCH 140 is coupled to processor 110 and memory 130 via buses 150 and 160, respectively. The"

GMCH 140 receives reference clock signals from the clock generator 120 and receives regulated voltages from a voltage regulator 170 as described below. Although not shown, computing device 100 may be powered by one or more internal batteries or an alternating current (AC) power routed from a power socket over a connector line.

Herein, processor 110 may be a microprocessor, a digital signal processor (DSP), an application specific integrated circuit (ASIC), a microcontroller or the like. GMCH 140 is coupled to processor 110 via bus 150 (e.g., front-side bus) to receive information to be processed and subsequently stored in memory 130 or displayed on a display unit 180 associated with computing device 100. Display unit 180 may be an integral component of computing device 100 or a peripheral device separate from and external to computing device 100 as shown.

Clock generator 120 is situated internally within computing device 100. However, it is contemplated that clock generator 120 may be located external to computing device 120. Clock generator 120 provides a first clock (HOST_CLK) signal 190 to processor 110 and one or more clock signals to GMCH 140. For example, the HOST_CLK signal 190 and a secondary clock (CLK2) signal 195 may be supplied to GMCH 140, where the CLK2 signal 195 has a lower frequency than the HOST_CLK signal 190. In one embodiment, HOST CLK and CLK2 signals 190 and 195 may have frequencies of approximately 66 megahertz (66 MHz) and 48 MHz, respectively.

II. Embodiments of the Graphics Memory Controller Hub

Figure 2:
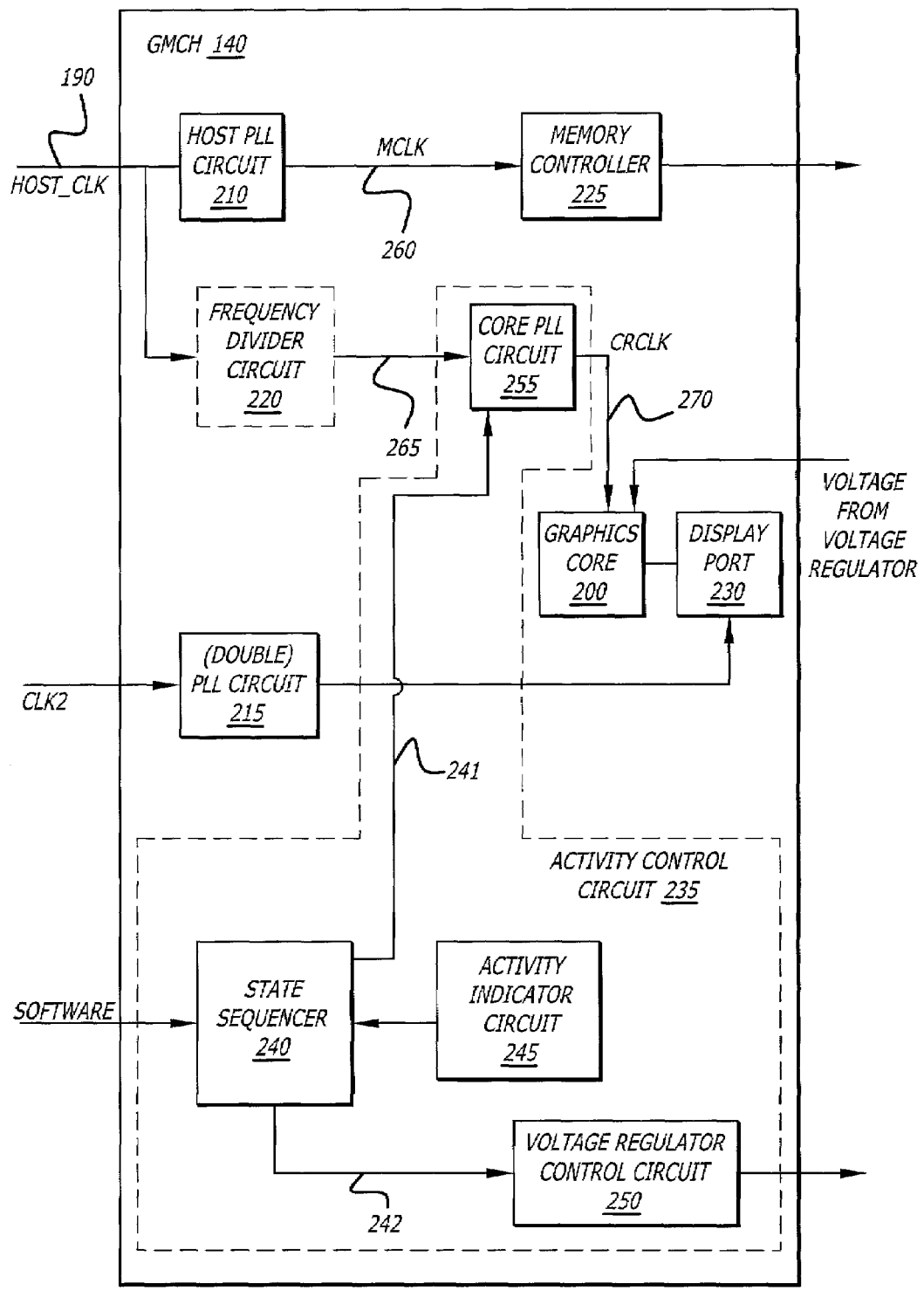
FIG. 2 is a first exemplary embodiment of the graphics memory controller hub (GMCH) operating in concert with a clock generator to control core frequency and/or voltage.

Referring now to FIG. 2, a first exemplary embodiment of graphics memory controller hub (GMCH) 140 operating in concert with clock generator 120 to control core frequency and/or voltage usage is shown. For this embodiment, GMCH 140 comprises a graphics core 200, one or more clock sources 210 and 215 (e.g., phase locked loop "PLL" circuits), an optional frequency divider circuit 220, a memory controller 225, a display port 230 and an activity control circuit 235. Activity control circuit 235 includes a state sequencer 240, an activity indicator circuit 245, a voltage regulation control circuit 250, and a core PLL circuit 255.

As shown in FIG. 2, graphics core 200 performs graphic computations on incoming data and outputs such data to display unit 180 of FIG. 1 via display port 230. Graphics core 200 receives reference clock signaling originating from clock generator 120 of FIG. 1. For this embodiment, GMCH 140 receives HOST_CLK signal 190 and routes this clock signal to PLL circuit 210 and perhaps frequency divider circuit 220. The PLL circuit 210 generates a memory clock (MCLK) signal 260 based on the HOST_CLK signal 190. Unlike HOST_CLK signal 190, the MCLK signal 260 is programmable. The MCLK signal 260 is used by memory controller 225, which controls access to memory 130 of FIG. 1.

Frequency divider circuit 220, when implemented, adjusts the frequency of HOST_CLK signal 190 and passes the adjusted clock signal 265 to Core PLL circuit 255. Core PLL circuit 255 generates a programmable, rendering clock (CRCLK) signal 270 based on the incoming adjusted clock signal 265 and provides the CRCLK signal 270 to graphics core 200 for clocking purposes.

Referring still to FIG. 2, for this embodiment of the invention, activity control circuit 235 includes an activity indicator circuit 245 that monitors data processing activity by GMCH 140. Such monitoring may be accomplished by sensing when graphics core 200 is active (processing data) or idle. For instance, when graphics core 200 is actively processing data, a control signal (not shown) sensed by activity indicator circuit 245 is asserted (e.g., logic High for a selected polarity). Otherwise, the control signal is deasserted (logic Low for a selected polarity). By periodically sampling this control signal, a determination can be made as to the percentage that the graphics core is active. From that percentage, state sequencer 240 can determine if a frequency of the CRCLK signal 270 is appropriate or needs to be altered.

It is contemplated that activity control circuit 235 may be configured to control other operational behaviors of the computing device besides clocking frequency or applied voltage to graphics core 200. Examples include clock speed ratios, clock throttling percentages, refresh rates, backlight brightness and the like. However, for illustrative purposes only, frequency and adjustment is discussed.

If core PLL circuit 255 only supports two different clock frequencies, state sequencer 240 provides an asserted control signal 241 to Core PLL circuit 255 to select the higher frequency clock signal (referred to as the "'fast' frequency signal"). Otherwise, a deasserted control signal is provided to Core PLL circuit 255 to select the lower frequency clock signal (referred to as the "'slow' frequency signal"). If Core PLL circuit 255 supports more than two different clock frequencies, state sequencer 240 may be adapted to provide multiple control signals that corresponds to one of a plurality of clock frequencies for graphics core 200. For example, two control signals (00, 01, 10, 11) may support four different clocks of varying frequencies.

Upon altering the frequency of graphics core 200, state sequencer 240 also provides a control signal 242 to voltage regulator control circuit 250, which signals the voltage regulator 170 of FIG. 1 to adjust the voltage supplied to graphics core 200. This voltage may range, for example, from approximately 1.5 volts to approximately 0.9 volts or less. The adjustment of the voltage may correspond to the change in frequency and such voltage adjustment may occur prior to ungating the adjusted clock signal.

Figure 3:
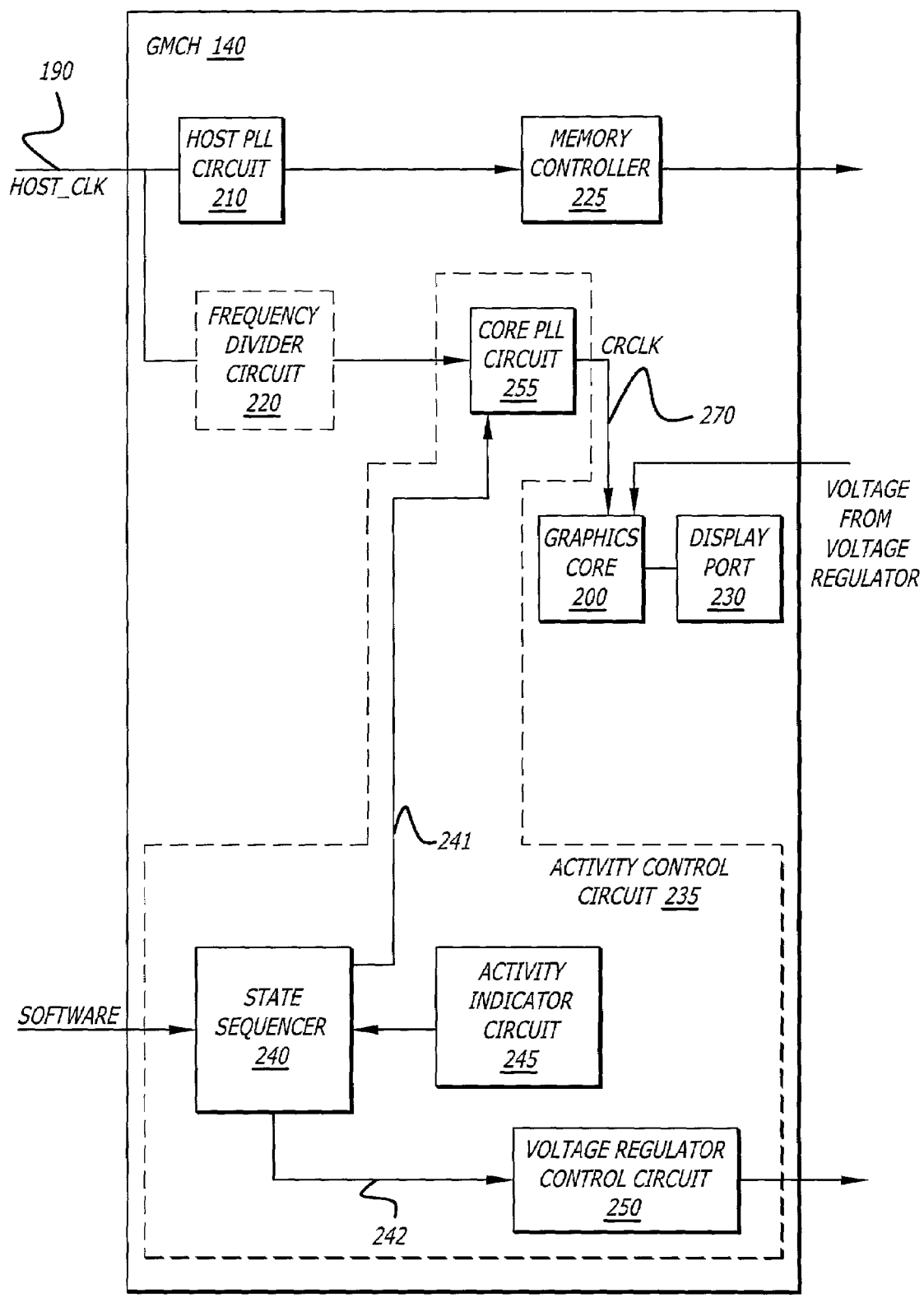
FIG. 3 is a second exemplary embodiment of the graphics memory controller hub (GMCH) operating in concert with a clock generator to control frequency and/or voltage utilized by the display.

Referring to FIG. 3, a second exemplary embodiment of the graphics memory controller hub (GMCH) 140 operating in concert with clock generator 120 to control core frequency and/or voltage is shown. For this embodiment, GMCH 140 excludes PLL circuit 215 that adjusts the frequency of the clock signal applied to display port 230. But, GMCH 140 features the other components such as graphics core 200, PLL circuit 210, optional frequency divider circuit 220, memory controller 225, display port 230 and activity control circuit 235 as described above.

III. An Embodiment of an Activity Control Circuit

A. Exemplary Logic of the Activity Control Circuit

Figure 4:
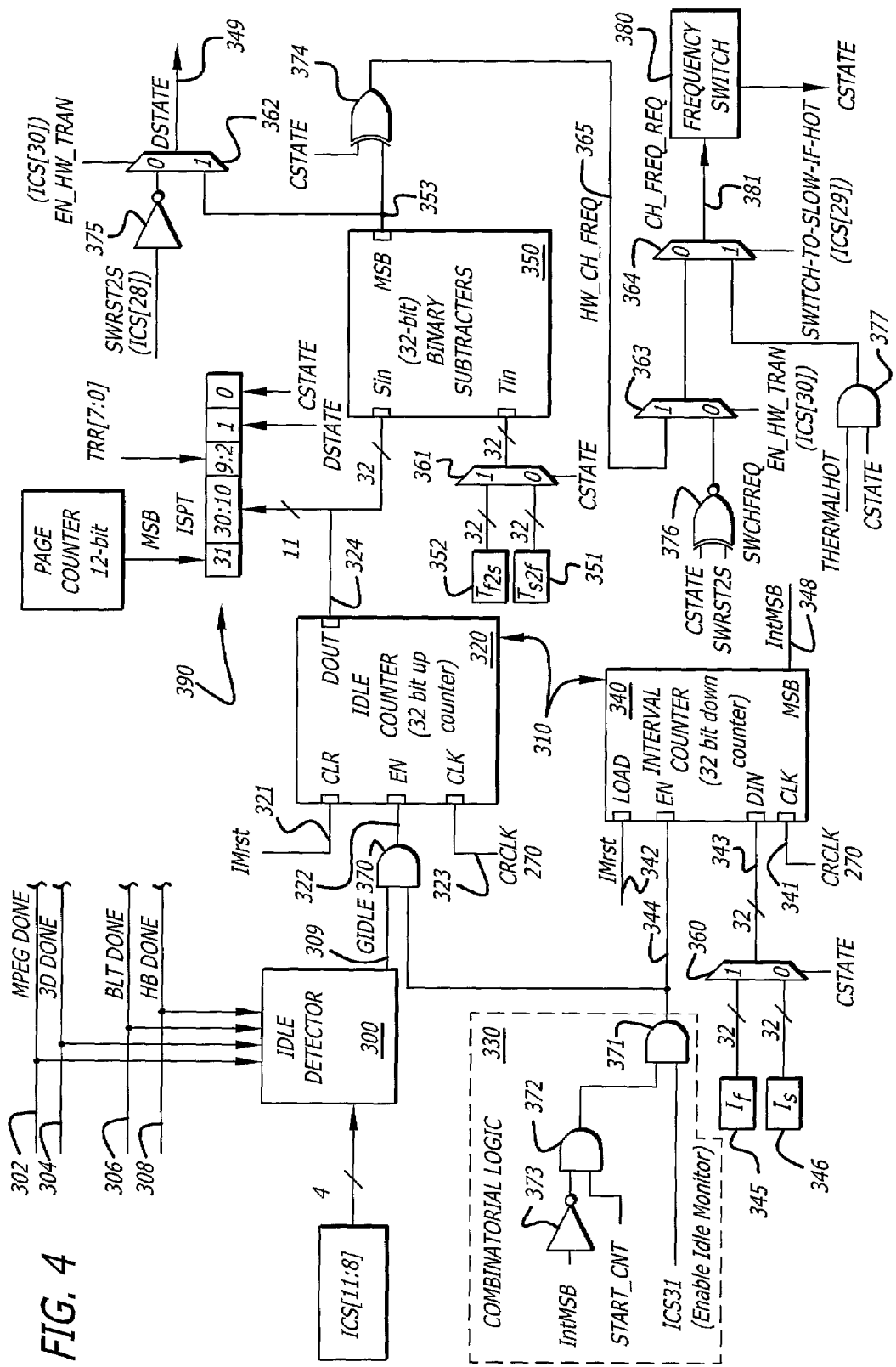
FIG. 4 is an exemplary embodiment of an activity control circuit of the GMCH, in particular the state sequencer and activity indicator circuit of FIGS. 2 and 3.

Referring now to FIG. 4, an exemplary embodiment of activity control circuit 235, in particular state sequencer 240 and activity indicator circuit 245 of FIGS. 2 and 3 is shown. In general, such circuitry includes an idle detector 300, an idle monitor 310, a substractor 350, select elements (e.g., multiplexers) 360–364, logic gates 370–377, and a frequency switching unit 380 described in detail below. In general, frequency switching unit 380 operates as state sequencer 240 of FIG. 2 while the remainder of the circuitry operates as activity indicator circuit 245.

In one embodiment of the invention, in order to maintain a balance between power consumption and performance, activity control circuit 235 supports frequency switching of the CRCLK signal 270 used by the GMCH 140 of FIG. 1. To eliminate any potential performance lost, idle monitor 310 is adapted to measure the idleness of a render engine of GMCH 140 of FIG. 1.

In particular, for one embodiment of the invention, the CRCLK signal 270 is configured to switch from a "fast" frequency ($F_f$) to a "slow" frequency ($F_s$, where $F_f > F_s$) when a specific threshold ($T_{f2s}$) of idleness is met. This threshold, referred to as a "fast-to-slow (F2S) state threshold" may be static or programmably set during a power-up condition by the Basic Input Output System (BIOS) of the computing device or perhaps by accessing contents of a particular memory location or register. This threshold may be represented as a bit value (e.g., 32-bit value) as presented in FIG. 4.

The CRCLK signal is also configured to switch from slow to fast frequencies when the level of activity increases so as to exceed a specific activity threshold, referred to as a "slow-to-fast (S2F) state threshold" ($T_{s2f}$). Similarly, the S2F state threshold may be preset and represented by a bit value (e.g., 32-bit value). Only the CRCLK signal frequency can change dynamically on demand, all other clocks will remain unchanged after boot.

Besides measured idleness, other frequency switching events may be triggered through software control. For example, the discontinuation of AC power (e.g., disconnection of a connector line through removal of its AC plug from a power socket) can be detected and cause a software routine to switch the CRCLK signal to a slower frequency setting for longer battery life.

To reduce unnecessary switching back and forth under the same load, hysteresis can be provided. One way that this can be accomplished is by ensuring that the level of busyness required to initiate a high-to-low freqency transition is substantially lower than the level of busyness it takes to initiate a low-to-high frequency transition. The relationship between frequency, system power, and hysteresis is given by equation (1):

$$T_{f2s} < I_s - ((I_f - T_{f2s}) * F_f * I_s)/(I_f * F_s) \text{ where } T_{f2s} = \quad (1)$$
$$F2S \text{ state threshold; } T_{s2f} = F2S \text{ state threshold; } I_s =$$
$$\text{slow state interval; } I_f = \text{fast state interval; } F_s =$$
$$\text{slow frequency and } F_f = \text{fast frequency.}$$

As shown in FIG. 4 below, operations of activity control circuit 235 are based, in part, on various control state signals. These control state signals include, but are not limited to a desired state of the GMCH (DSTATE), a current state of the (CSTATE), a change frequency request based on hardware of the idle monitor (HW_CH_FREQ), and/or a change frequency request (CH_FREQ_REQ) based on either hardware, software or thermal conditions.

More specifically, "DSTATE" signifies the desired frequency state level for the electronic device. The value of DSTATE may be stored as a bit of an Idle Status Page (ISP) register 390 (e.g., ISP[1]), perhaps located in memory (not shown) of the GMCH as shown in FIG. 5A. The ISP register provides activity and temperature information for software and hardware to make frequency and voltage throttling decisions. Herein, for this embodiment of the invention, DSTATE is asserted (DSTATE=logic "High") to set and maintain the CRCLK signal at the "fast" frequency level. DSTATE is deasserted (DSTATE=logic "Low") to set and maintain CRCLK at the "slow" frequency level. DSTATE can be determined by either hardware or software.

When determined by hardware, in response to setting of a Hardware Enable Transition bit of the Idle Control and Status (ICS) register 395 of FIG. 5B (EN_HW_TRAN=ICS[30]=logic "High"), the most significant bit (MSB) associated with the output from subtractor 350 is equal to the DSTATE value. Otherwise, when determined by software, DSTATE is generally equivalent to the inverted value of a Software Reset-to-Slow (SWRST2S) signal (e.g., ICS[28]).

In one embodiment of the invention, "CSTATE" signifies the current state of the CRCLK signal. The value of CSTATE may be stored as a bit of the ISP register 390 (e.g., ISP[0]). CSTATE is asserted to select the CRCLK signal at the "fast" frequency. CSTATE is deasserted to select the "slow" frequency. After all domain activity is stalled, the frequency of CRCLK will be switched (from fast to slow for example) by assigning the DSTATE value as the CSTATE value.

When asserted, "HW_CH_FREQ" signifies a hardware determined change frequency event ("fast" to "slow" or "slow" to "fast"). HW_CH_FREQ is based on idle monitor operations. For instance, when the CRCLK signal is operating at the fast frequency (CSTATE=logic "High") and the sampled idle count is greater than the F2S state thresold ($T_{f2s}$), HW_CH_FREQ is asserted (HW_CH_FREQ=logic "High"). When the is operating at the slow frequency (CSTATE=logic "Low") and the sampled idle count is less than the S2F state threshold ($T_{s2f}$), HW_CH_FREQ is asserted.

"CH_FREQ_REQ" is generally based on either hardware or software prompted events and thermal readings. When CH_FREQ_REQ is asserted, it signifies a change frequency request (can be from fast to slow or from slow to fast) made to the frequency switching unit 380. The CH_FREQ_REQ value is determined in response to two criterion. The first criterion determines whether hardware or software request will be served. Such determination is based on the EN_HW_TRAN value (EN_HW_TRAN is asserted when a hardware determined change frequency request will be served).

The second criterion determines whether a change frequency request is needed based on the sensed temperature (TRR[7:0]) of the GMCH, which may be stored in the ISP register 390 (e.g., ISP[9:2]). For this embodiment of the invention, a THERMALHOT parameter is set to logic "1" when the sensed temperature is above a given threshold. However, even if the sensed temperature is above a given threshold, the CRCLK signal is still permitted to change from a "fast" frequency. Otherwise, where CSTATE is deasserted, a SWITCH_TO_SLOW_IF_HOT (e.g., IC[29]) and THERMALHOT parameter is asserted, which causes CH_FREQ_REQ to be deasserted, signifying no change in frequency level. In summary, the second criterion is used to prevent a slow-to-fast frequency switch transition if the sensed temperature of the GMCH is above a set threshold.

As shown in FIG. 4, idle detector 300 generates an active Global Idle (GIDLE) signal 309 when certain units are idle. For this embodiment, these units may include one or more of the following: MPEG compression/decompression unit (MPEG_DONE 302 when idle), three-dimensional rendering unit (3D_DONE 304 when idle), two-dimensional rendering unit or blitter (BLT_DONE 306 when idle) and/or hardware binning unit (HB_DONE 308 when idle). Each of the "DONE" signals 302, 304, 306 and/or 308 can be masked or unmasked by register bits in the ICS register 395 for testing and providing a flexible activity counting policy.

Figure 6:
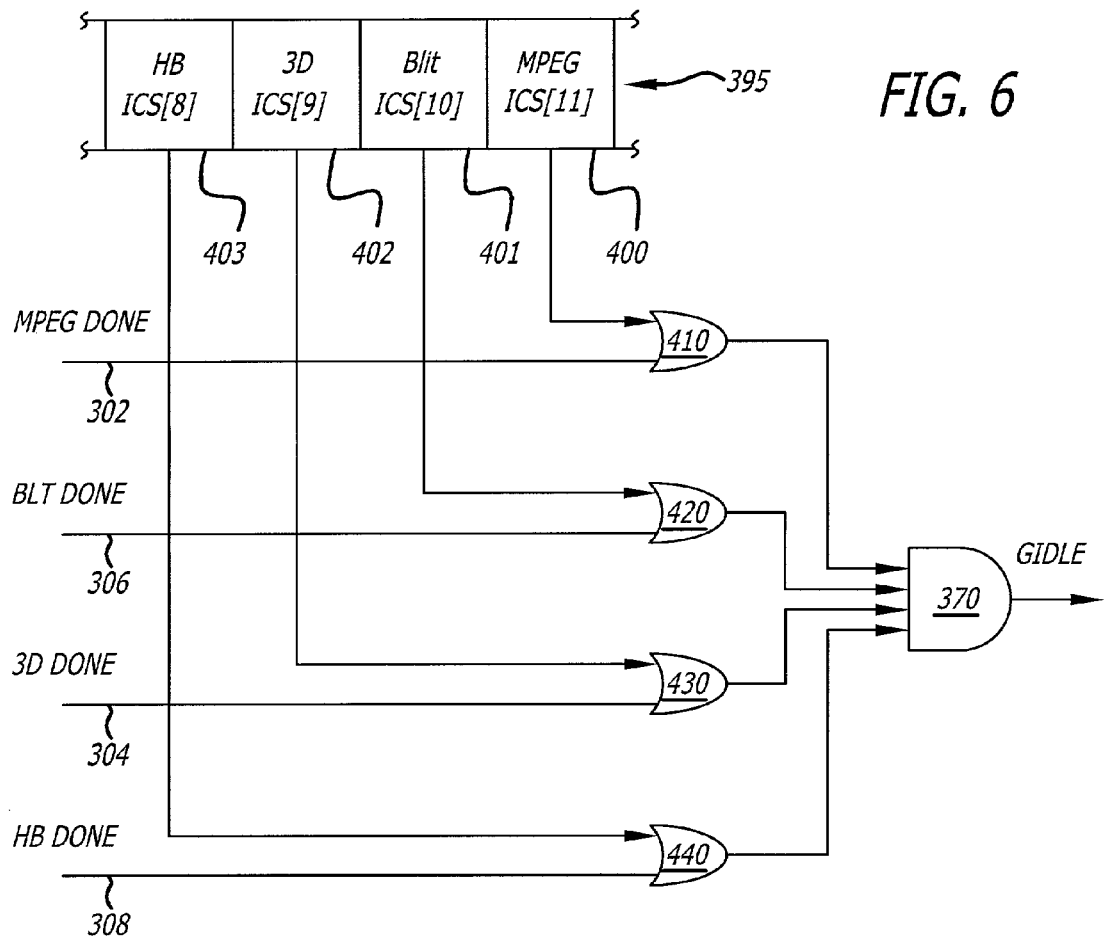
FIG. 6 is an exemplary embodiment of an idle detector of the activity control circuit of FIG. 4.

For example, as shown in FIG. 6, four bits 400–403 of the ICS register 395 (ICS[11:8]) uniquely correspond to DONE signals 302, 304, 306 and 308. Thus, setting of the ICS[11] causes an active signal from a first logic gate 410 (e.g., an OR gate) to be output so that the MPEG_DONE signal 302 is masked (e.g., placed in an asserted logic "High" state). Similar, the setting of ICS[10:8] causes active signals from other logic gates 420, 430 and 440 (e.g., OR gates) so as to cause 3D_DONE, BLT_DONE and HB_DONE signals 304, 306, 308 to be masked as well.

Referring back to FIG. 4, idle monitor 310 is adapted to determine the idleness of the render engine within a preset time interval. Based on these idle measurements, the idle monitor 310 may generate the DSTATE signal the CH_FREQ_REQ signal. Software can also set the DSTATE and CH_FREQ_REQ signals. Since GIDLE 309 is sampled every cycle of CRCLK 270 and the interval counter 340 is also counting in CRCLK cycles, idle monitor 310 is running in CRCLK domain.

Idle monitor 310 comprises an idle counter 320 and an interval counter 340. Idle counter 320 includes a plurality of inputs 321–323. For this embodiment of the invention, a Clear (CLR) input 321 causes idle counter 320 to be reset upon receipt of a reset signal (IMrst) at power-up. The Clock (CLK) input 323 allows the idle counter 320 to be clocked by the CRCLK signal 270. The Enable (EN) input 322, upon receipt of an asserted signal, causes the idle counter 320 to begin counting. As shown, Enable input 322 is coupled to a first logic gate 370 (e.g., AND gate), which begins the counting process when the GIDLE signal 309 is asserted and an output from combinatorial logic unit 330 is asserted.

As shown, combinatorial logic unit 330 includes a second logic gate 371 (e.g., AND gate functionality) having a first input to receive a value of an idle monitor enable bit of the ICS register (ICS[31]) from software and a second input coupled to a collection of logic gates 372 and 373 (e.g., AND gate 372 and inverter 373). Combinatorial logic unit 330 outputs an active signal in response to (i) interval counter 340 not passing zero during a count-down sequence (most significant bit of interval counter 340 "IntMSG" is deasserted "0") and (ii) the Start Count (START_CNT) signal has been asserted to begin the count sequence.

Idle counter 320 further includes an output 324 to transfer an idle count into ISP register 390. For this embodiment, the output is a binary value stored within multiple bits of the ISP register 390 (e.g., ISP[30:10]).

In addition, interval counter 340 includes a plurality of inputs 341–344. For this embodiment, interval counter 340 is clocked by CRCLK signal, which is provided to a Clock (CLK) input 341. A Load (LOAD) input 342 causes interval counter 340, upon reset, to be loaded with one of two values via Data-In (DIN) input 343. One value, namely either a fast state interval ($I_f$) 345 or a slow state interval ($I_s$) 346, is output by a select element 360 based on the value of CSTATE 347, the current state at which GMCH's CRCLK signal is running. The Enable (EN) input 344, upon receipt of an asserted signal, causes interval counter 340 to begin counting. As shown, EN input 344 is coupled to combinatorial logic unit 330.

Once interval counter 340 counts past zero, an output (e.g., an integer value of the most significant bit "IntMSB") 348 is asserted. This causes both idle counter 320 and interval counter 340 to be halted since the output from logic gate 371 is deasserted for this embodiment. The idle count produced by idle counter 320 is then sampled along with the values of CSTATE 347. The idle count is compared with either the S2F state threshold ($T_{s2f}$) 351 or the F2S state threshold ($T_{f2s}$) 352 output by a select element 361 controlled by CSTATE 347.

When sampled idle count exceeds or perhaps is equal to the selected state threshold value and CSTATE 347 is asserted, the output signal (MSB) 353 is deasserted and routed to a logic gate 374 (e.g., Exclusive OR "XOR" gate). The output of logic gate 374 is equivalent to the HW_CH_FREQ signal 365, namely, as shown in equation (2):

$$HW\_{CH}\_FREQ = CSTATE \oplus MSB. \quad (2)$$

If the frequency state is determined by the hardware of the GMCH, EN_HW_TRAN (ICS[30]) is asserted so that MSB 353 from subtractor 350 is output from select element 362, and thus, is equal to the value of DSTATE 391. The HW_CH_FREQ signal 365 is routed via select element 363 into select element 364.

If the sensed temperature of the GMCH, stored as a thermal value in bits the ISP register (e.g., ISP[9:2]), does not exceed a particular threshold, the CH_FREQ_REQ signal 381 is asserted and applied to frequency switching unit 380 if the CRCLK signal is currently operating at a "fast" frequency. Alternatively, the CH_FREQ_REQ signal 381 is deasserted if the is currently operating at a "slow" frequency.

If the sensed temperature exceeds a given threshold, the THERMALHOT signal is asserted and the control signal of the select element 364 is asserted. Thus, if the current frequency of the CRCLK signal is at a "slow" frequency level (CSTATE=logic "Low"), the CH_FREQ_REQ signal is deasserted. However, if the current frequency of the CRCLK signal is at a "fast" frequency level (CSTATE=logic "High"), the CH_FREQ_REQ signal 381 is asserted to allow for a reduction in CRCLK frequency.

If the frequency state is determined by software, EN_HW_TRAN (e.g., ICS[30]) is deasserted so that an opposite state of SWRST2S sets the value of DSTATE 349, caused by logic gate 375. Frequency switching unit 380 is then effectively set by the XOR result of SWRST2S and CSTATE as provided by logic gate 376. The same temperature sensing override is provided by logic gate 377.

B. Exemplary Operations of Activity Control Circuit

Figure 7A:
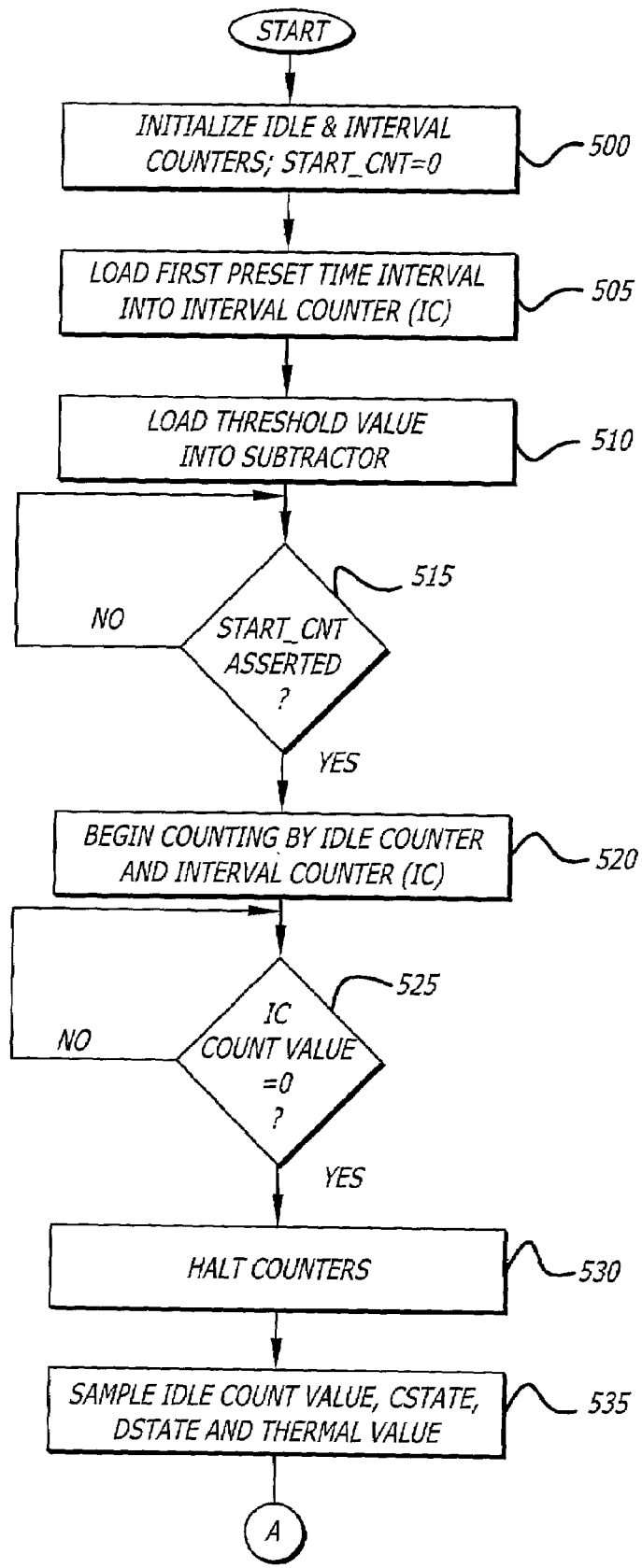
FIGS. 7A and 7B are an exemplary embodiment of a flowchart outlining general frequency switching operations from a ""fast"" to ""slow"" frequency by the activity control circuit of FIG. 4.
Figure 7B:
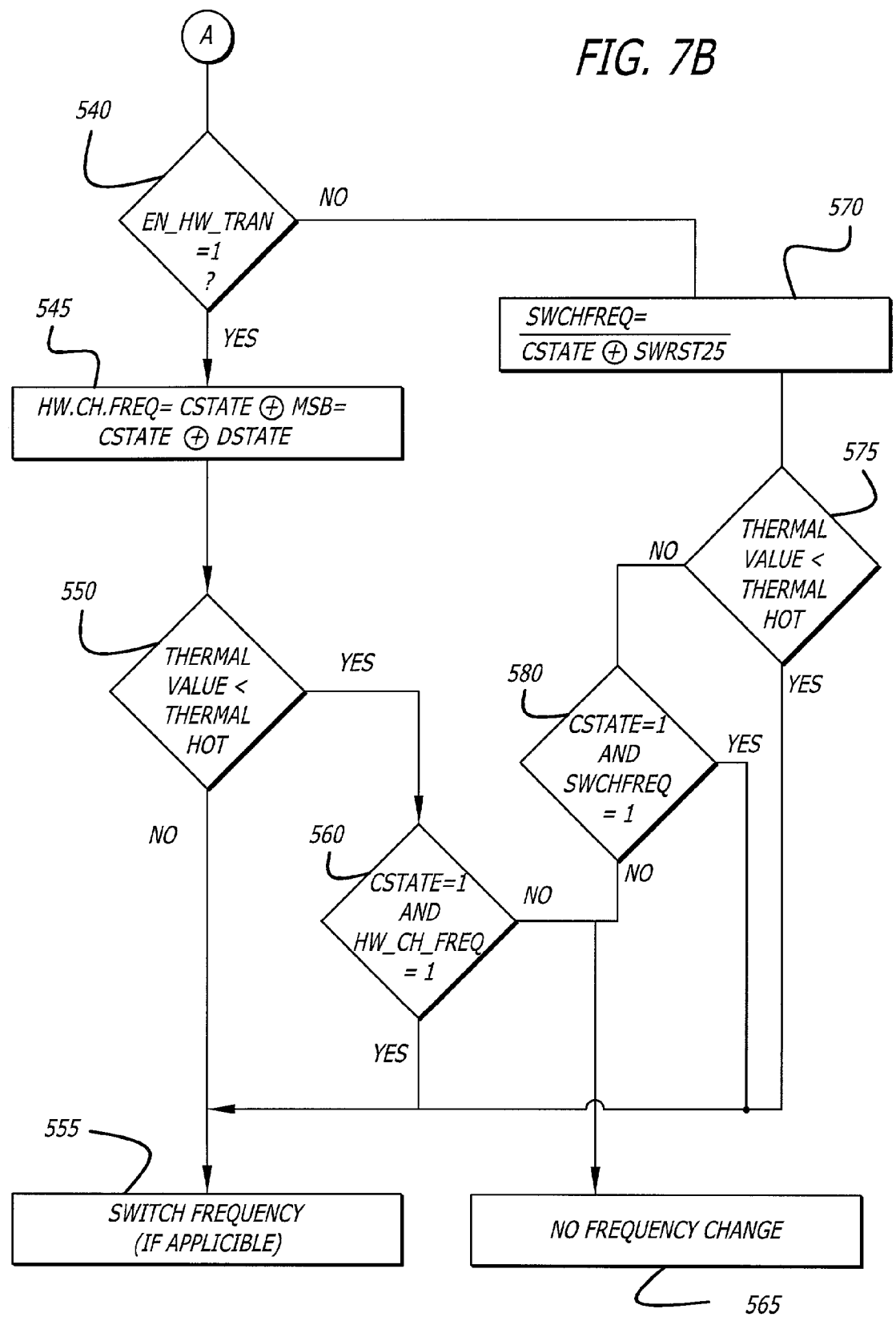

Referring now to FIGS. 7A and 7B, an exemplary embodiment of a flowchart outlining general frequency switching operations from a "fast" to "slow" frequency of the activity control circuit of FIG. 4 is shown. During this operation, both idle and interval counters are initialized in response to being enabled by software (block 500). Since CSTATE is asserted, a first preset time interval is loaded into the interval counter at power-up (block 505). The first preset time interval is equivalent to the fast state interval for this particular illustrative embodiment. Also, the fast-to-slow threshold is loaded into the subtractor (block 510).

When START_CNT signal is asserted, both the idle and interval counters will start counting (blocks 515 and 520). GIDLE is asserted for every cycle of CRCLK signal while interval counter is counting down from the first preset time interval. Once the interval counter counts past zero, a control signal is asserted, causing both counters to be stopped (blocks 525 and 530). The idle counter value, CSTATE, DSTATE and thermal value identifying the current temperature of the GMCH are sampled (block 535).

If DSTATE is determined by hardware (e.g., EN_HW_TRAN is asserted), the value routed over the HW_CH_FREQ signal is equivalent to CSTATE ⊕ DSTATE (blocks 540 and 545). Thus, if DSTATE differs from CSTATE and the sensed temperature of the GMCH is less than a particular threshold, the CRCLK signal of the GMCH will undergo a frequency switching operation that is transparent to the user (blocks 550 and 560). However, if the sensed temperature is greater than the particular threshold, the frequency switching operation may still occur if the desired transition is to a lower frequency (blocks 550 and 555). If the desired transition is to a higher frequency, no frequency switching operation will occur (blocks 560 and 565).

If DSTATE is determined by software (e.g., EN_HW_TRAN is deasserted), the value of the software change frequency signal (SWCHFREQ) is equivalent to equation (3) as shown in block 570:

SWCHFREQ=[CSTATE ⊕ SWRST2S]#, where
"#" represents an inversion of the XOR result. (3)

Thus, if the sensed temperature of the GMCH is less than a particular threshold, the CRCLK signal of the GMCH will undergo a frequency switching operation that is transparent to the user (blocks 555 and 575). However, if the sensed temperature is greater than the particular threshold, the frequency switching operation may still occur if the desired transition is to a lower frequency and SWCHFREQ is asserted (block 580). If the desired transition is to a higher frequency, no frequency switching operation will occur (block 565).

IV. Exemplary Operations of Frequency Switching Unit

Figure 8:
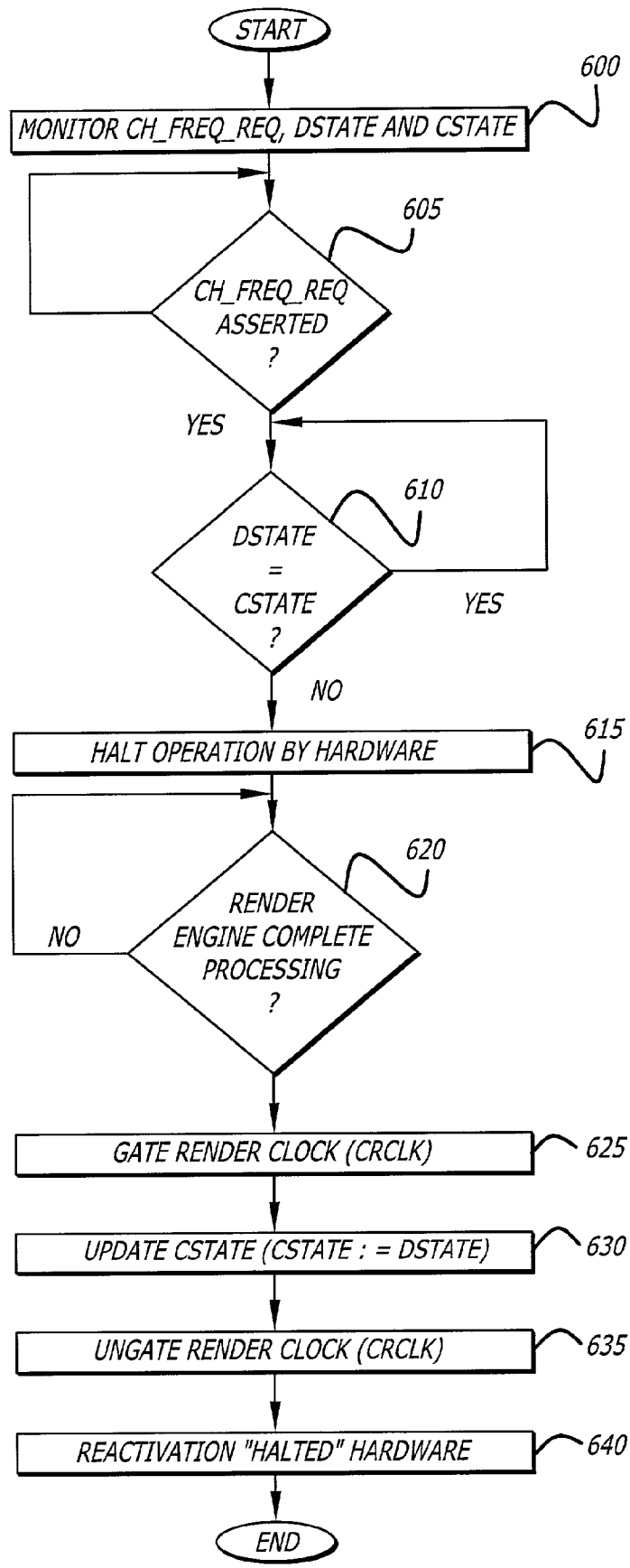
FIG. 8 is an exemplary embodiment of a flowchart illustrating operations of the frequency switching unit of activity control circuit of FIG. 4.

Referring now to FIG. 8, an exemplary embodiment of a flowchart illustrating operations of the frequency switching unit is shown. The frequency switching unit monitors the CH_FREQ_REQ signal as well as the values of CSTATE and DSTATE (block 600). Once CH_FREQ_REQ signal is asserted and DSTATE is not equal to CSTATE, the frequency switching unit is enabled (blocks 605 and 610). It is contemplated that if CH_FREQ_REQ signal is asserted but DSTATE is equal to CSTATE, a frequency switching operation may have recently occurred so that the request is ignored.

After the frequency switching unit has been enabled, the operations of certain hardware (e.g., command parser, etc.) can be halted to allow render hardware to be idle, provided the rendering hardware temporarily continues operations until processing of the pending commands has been completed (blocks 615 and 620). Thereafter, the CRCLK signal is gated (block 625).

After the CRCLK signal has been gated, the frequency switching unit updates the value of CSTATE by assigning the value of DSTATE to CSTATE (block 630). Thereafter the CRCLK signal is ungated and the certain hardware and render engine continue operations (blocks 635 and 640). This allows the frequency switching unit to service the next Change Frequency request when initiated. Of course, in lieu of gating the CRCLK signal, smooth transitioning from one clock frequency to another may be accomplished through other means (e.g., Wait states). If the CRCLK signal is not gated, rendering is still possible during the frequency switch because it is not necessary to wait for pending commands to be completed.

Figure 9:
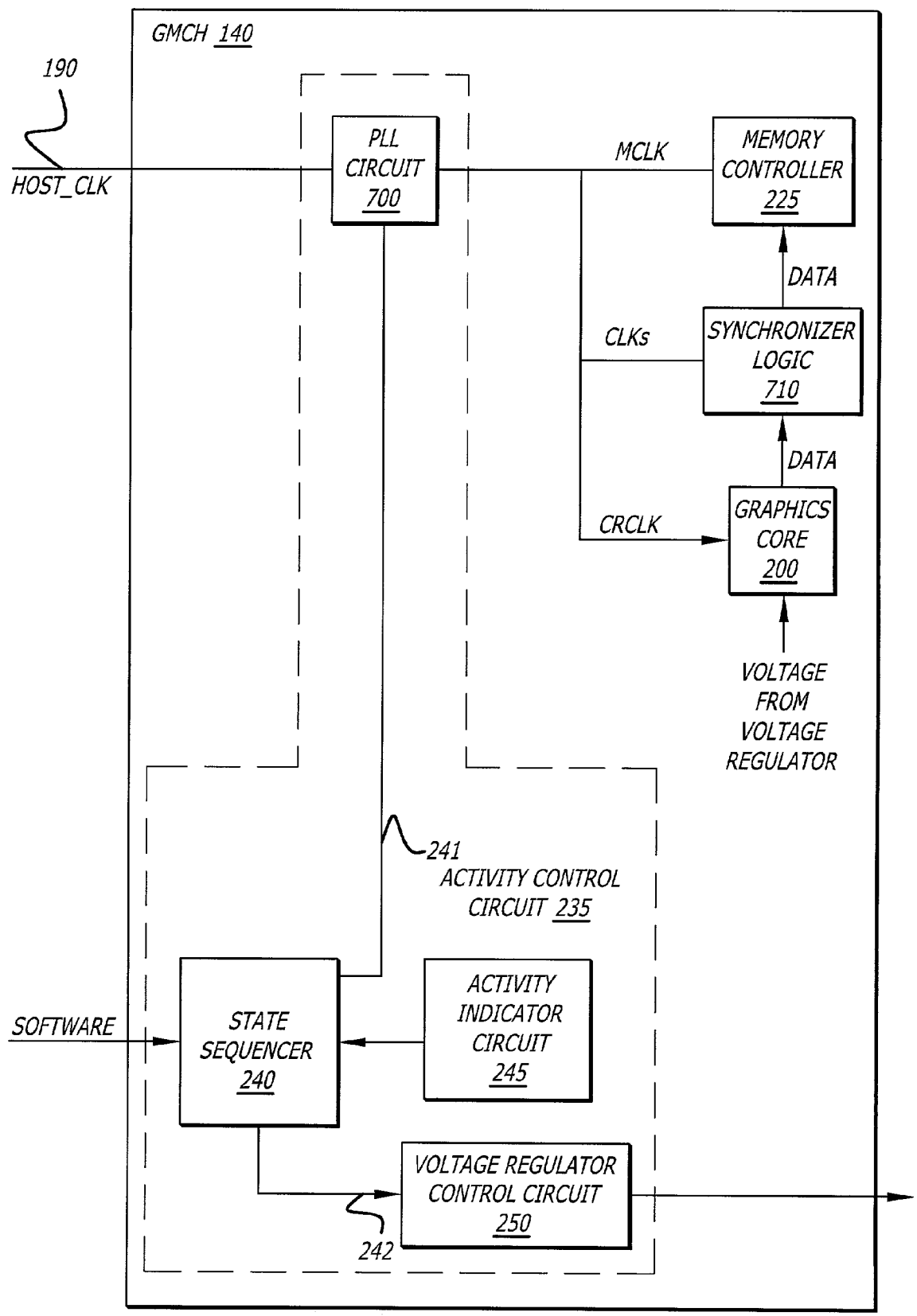
FIG. 9 is a third exemplary embodiment of the graphics memory controller hub (GMCH) operating in concert with a clock generator to control frequency and/or voltage utilized by the display.

Referring to FIG. 9, a third exemplary embodiment of the GMCH operating in concert with a clock generator to control frequency and/or voltage utilized by the display is shown. For this embodiment, GMCH 140 uses a single PLL circuit 700 operating in combination with synchronizer logic 710, which supplies clock signals of differing frequencies to graphics core 200 and memory controller 225 for example. As shown, multiple clock frequency levels (CLKs) are supported by synchronizer logic 710.

The synchronizer logic 710 enables frequency switching on the fly without the need for PLL circuit re-locks and clock glitches on the clock line. Such frequency switching occurs from a clock signal (CHCLK) having a fast frequency ($F_f$) to a memory clock frequency (MCLK) and from the memory clock frequency (MCLK) to a clock signal (CLCLK) having a slow frequency ($F_s$). In general, it provides a continuous sampling scheme to allow deterministic transfer of data between cross clocked logic.

Figure 10:
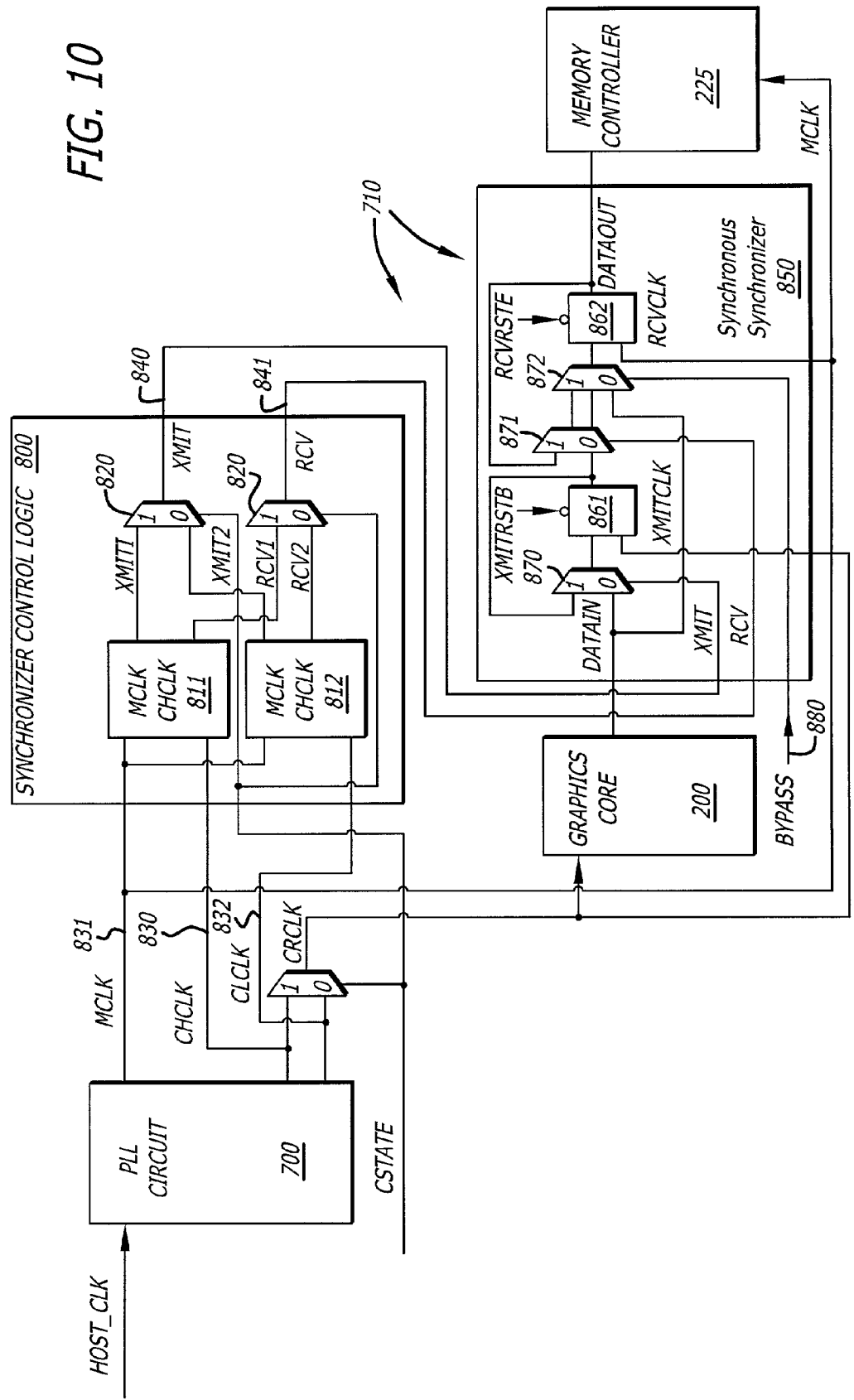
FIG. 10 is an exemplary embodiment of synchronizer logic of FIG. 9.

More specifically, as shown in FIG. 10, an exemplary embodiment of synchronizer logic 710 comprises a synchronizer control logic 800 and a synchronous synchronizer 850. Synchronizer control logic 800 comprises a plurality of sampling circuits 811,812 and a plurality of select elements 820 (e.g., multiplexers). Select elements 820 are cross-connected to the sampling circuits 811,812. Synchronizer 850 comprises a plurality of flip-flops 861,862 and a plurality of select elements 870–872.

Each sampling circuit samples edges of two incoming signals to generate a transmit (XMIT) signal 840 and a receive (RCV) signal 841. This may be accomplished by a first sampling circuit 811 sampling rising edges of both CHCLK signal 830 and lagging MCLK signal 831 to compute an asserted portion of XMIT signal 840. The sampling of falling edges of CHCLK and MCLK signals 830, 831 may be used to compute deasserted portion of RCV signal 841. Similarly, second sampling circuit 812 performs edge sampling of both MCLK signal 831 and lagging CLCLK signal 832.

In response to a deasserted CSTATE value, a transition occurs from a slow frequency ($F_s$) to an intermediary frequency associated with MCLK ($F_m$, where $F_m>F_s$). For this embodiment of the invention, the transition may be accomplished by clocking graphics core 200 with CLCLK 832 and synchronizer control logic 800 controlling the latching of data by flip-flops 861 and 862 of synchronizer 850. A first flip-flop 861 is clocked with CLCLK 832 and a second flip-flop 862 is clocked by MCLK 831. Moreover, both XMIT and RCV signals 840 and 841 control the propagation of data through select elements 870–871 from graphics core 200 to memory controller 225.

For transition from a fast frequency ($F_f$) to the memory controller frequency ($F_m$, where $F_f>F_m$), the transition may be accomplished by clocking first flip-flop 861 with CHCLK and second flip-flop 862 with MCLK 831. Again, XMIT and RCV control control signals 840 and 841 control the propagation of data through select elements 870 and 871 from graphics core 200 to memory controller 225. A Bypass signal 880 controlling select element 872 to allow data to bypass first flip-flop 861.

For the GMCH, multiple clock domains are being used. The clock domain frequencies vary from interface to interface with no nice ratio between these frequencies. In order to allow deterministic transfer between logic that runs at different frequency domains, synchronizer logic 710 has been developed. A multiplexer is placed in front of a flip-flop. The synchronizer control logic will sample the clock edges and generate XMIT and RCV signals based on the timing margin between CLCLK and MCLK or CHCLK and MCLK (excluding set-up time). The synchronizer 810 will then use these control signals. When a transmit is permitted, XMIT signal is asserted and the data passes through the multiplexer to the second flip-flop. The same thing applies to the receive side.

Figure 11:
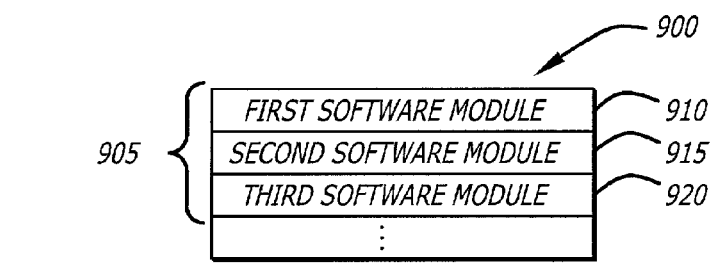
FIG. 11 is an exemplary embodiment of the software modules controlling GMCH frequency and voltage throttling.

Referring now to FIG. 11, an exemplary embodiment of the software modules stored in a machine-readable medium 900 of a computing device that control GMCH frequency and voltage throttling is shown. A plurality of software modules 905 may be configured to alter frequency or voltage levels based on a variety of events.

For instance, a first software module 910 may increase or decrease the frequency of the rendering clock (CRCLK) and voltage applied to the graphics core based on activity (e.g., idleness of the render engine). A second software module 915 may alter frequency and voltage based on battery power levels and whether the computing device is coupled to an AC power outlet. The frequency of the rendering clock is lowered in response to reduced power levels measured for one or more batteries of by computing device. A third software module 920 may alter frequency and voltage based on thermal temperatures measured within the casing surrounding logic of the computing device or measured at certain hardware components of the computing device. The frequency of the rendering clock is lowered in response to thermal readings above predetermined thermal constraints set by either the user or the manufacturer.

Figure 12:
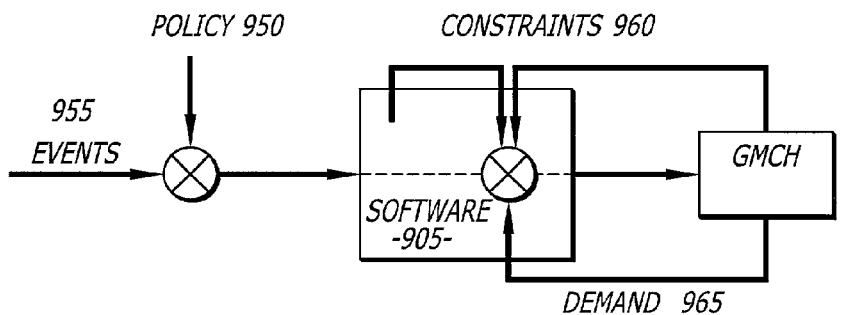
FIG. 12 is a diagram of exemplary general operations of the software modules of FIG. 11.

As shown in FIG. 12, general exemplary operations of the software modules 905 used for power conservation through throttling of frequency and voltage applied to the GMCH is shown. Based on a selected policy 950 of power conversation, in response to events 955 (e.g., activity/idleness, power or thermal levels, etc.), software 905 may be configured to alter the frequency and voltage applied to the GMCH 140. The alteration is based on "constraints" 960 (e.g., preselected threshold parameters) and "demand" 965.

Herein, for a certain embodiment of the invention, there are two general types of policies for controlling the operational behavior of the computing device: proactive and reactive. Proactive policy assumes one policy over another. For instance, if the user indicates a preference for maximum battery life over performance, the software may proactively reduce power (e.g., reduce frequency of the rendering clock) without receiving a signal from the GMCH. Reactive policy involves a response to an event such as the removal of an AC connector and balancing user preferences.

Figure 14:
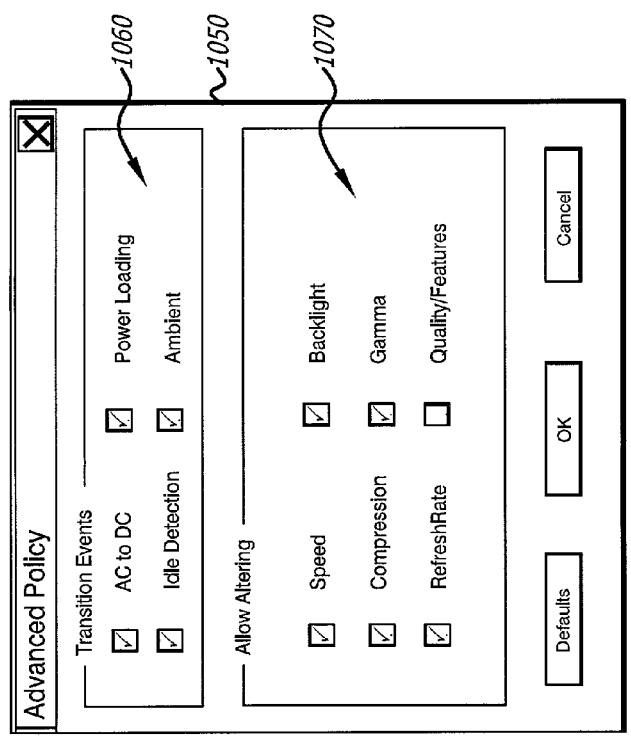
FIG. 14 is an exemplary embodiment of a second graphics user interface to program policies for controlling operational behavior of the computing device.
Figure 13:
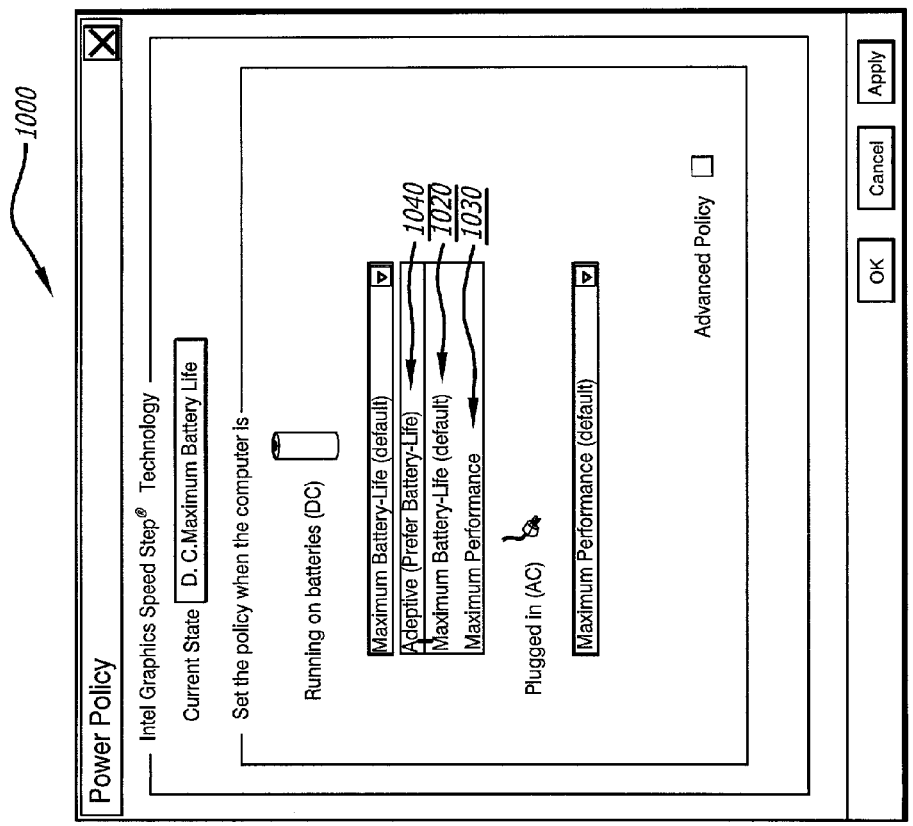
FIG. 13 is an exemplary embodiment of a first graphics user interface to program policies for controlling operational behavior of the computing device.

These policies can be set by the user through a graphics user interface 1000 generated by the computing device as shown in FIGS. 13 and 14. As shown in FIG. 13, the user can select different policies 1010 based on whether the computing device is battery operated or receiving AC power. These policies may include, for example, maximum battery life 1020, maximum performance 1030 or an adaptive policy 1040 that is skewed toward maximum battery life or performance. As shown in FIG. 14, a graphics user interface 1050 may be configure in accordance with either "reactive" policy conditions 1060 and/or "proactive" policy conditions 1070.

In one embodiment of the invention, the adaptive policy is designed to conduct transitions in operation based on processed demand and trends in demand. The "demand" may be computed based on instantaneous measurements of an event (e.g., idleness, demand, temperature) as well as trends (e.g., the combination of a current data sample associated with an event along with one or more previous data samples) or historial averages. In addition, adaptive policy may include computations of the cost of making a transition (e.g., number of megabits per second gained for each watt of power).

While this invention has been described in terms of several illustrative embodiments, this description is not intended to be construed in a limiting sense. Various modifications of the illustrative embodiments, as well as other embodiments of the invention, are deemed to lie within the spirit and scope of the appended claims.

What is claimed is:

1. A graphics memory controller hub comprising:
   a graphics core;
   a second core to receive a first clock signal; and
   a circuit responsive to software that is user selectable between a proactive policy and a reactive policy to alter a frequency of a render clock signal supplied to the graphics core without substantially altering a frequency of the first clock signal, the circuit further to monitor idleness of the graphics core and reduce a frequency level of the render clock signal if the idleness exceeds a determined percentage of time.

2. The graphics memory controller hub of claim 1, wherein the circuit comprises:
   a core phase locked loop (PLL) circuit coupled to the graphics core, the core PLL circuit to provide the render clock signal; and
   an activity control circuit to control an output of the core PLL circuit.

3. The graphics memory controller hub of claim 2 further comprising:
   a frequency divider circuit to provide a clock signal to the core PLL circuit, the clock signal being used to produce the render clock signal.

4. The graphics memory controller hub of claim 3 further comprising:
   a display port adapted to receive an output from the graphics core; and
   a phase locked loop circuit to provide a clock signal to the display port.

5. The graphics memory controller hub of claim 2, wherein the activity control circuit further comprises:
   an activity indicator circuit to determine idleness of the graphics core by monitoring data processing activity by the graphics core; and
   a state sequencer coupled to the activity indicator circuit and to the core PLL circuit, the state sequencer to signal an adjustment of the frequency level of the render clock signal in response to a determination by the activity indicator circuit.

6. The graphics memory controller hub of claim 5, wherein the activity indicator circuit comprises:
   an idle detector to generates an active Global Idle (GIDLE) signal when each of a plurality of units is idle, the plurality of units including at least two of a compression/decompression unit (MPEG_DONE), a three-dimensional rendering unit (3D_DONE), a two-dimensional rendering unit (BLT_DONE) and a hardware binning unit (HB_DONE).

7. The graphics memory controller hub of claim 6, wherein the activity indicator circuit further comprises:
   a register having at least one bit uniquely corresponding to each of the plurality of units so that a setting of a bit associated with a selected unit of the plurality of units operates as a mask so that the selected unit appears to be idle to the idle detector.

8. The graphics memory controller hub of claim 2 further comprising:
   a clock generator to generate at least a clock signal to provide to the core PLL circuit, the render clock signal being based on the clock signal.

9. The graphics memory controller hub of claim 5, wherein the activity control circuit further comprises:
   a voltage regulator circuit coupled to the activity indicator circuit, the voltage regulator circuit to adjust a voltage supplied to the graphics core.

10. An integrated device comprising:
    a graphics core;
    a memory controller: and
    a circuit responsive to software that is user selectable between a proactive policy and a reactive policy to control one of a voltage and a clock frequency supplied to the graphics core while a clock frequency supplied to the memory controller remains substantially unchanged, the circuit further to monitor an event associated with operational behavior of the graphics core and, responsive to detecting the event, to signal the graphics core to adjust one of a clock frequency and a voltage supplied to the graphics core, while a clock frequency supplied to the memory controller remains substantially unchanged.

11. The integrated device of claim 10, wherein the event monitored by the circuit is a percentage of idleness in relation to total run-time by non-data processing activity by the graphics core.

12. The integrated device of claim 11, wherein the circuit comprises:
   clock source circuitry coupled to the graphics core, the clock source circuitry to provide a render clock signal to the graphics core; and
   an activity control circuit to reduce a frequency level of the render clock signal supplied to the graphics core if the idleness exceeds a determined percentage of time.

13. The integrated device of claim 12, wherein the activity control circuit to increase the frequency level of the render clock signal if the percentage of idleness falls below a selected threshold.

14. The integrated device of claim 10, wherein adjusting the clock frequency includes adjusting a clock speed ratio.

15. The integrated device of claim 10, wherein adjusting the clock frequency includes adjusting a clock throttling percentage.

16. A computing device comprising:
   a processor; and
   a graphics memory controller hub coupled to the processor, the graphics memory controller hub including a graphics core, a memory controller, and circuitry responsive to software that is user selectable between a proactive and a reactive policy to alter a frequency of a render clock signal supplied to the graphics core and a voltage supplied to the graphics core, the circuitry further to reduce a frequency level of the render clock signal if a measured idleness of the graphics core has exceeded an idleness threshold, the circuitry to alter the frequency of the render clock signal without substantially altering a memory clock signal supplied to the memory controller.

17. The computing device of claim 16, wherein the circuitry of the graphics memory controller hub comprises:
   an activity indicator circuit to determine idleness by monitoring data processing activity by the graphics core; and
   a state sequencer coupled to the activity indicator circuit, the state sequencer to signal an adjustment of the frequency level of the render clock signal based on an amount of idleness determined by the activity indicator circuit.

18. The computing device of claim 17, wherein the activity indicator circuit comprises:
   an idle detector to generates an active Global Idle (GIDLE) signal when each of a plurality of units is idle, the plurality of units including at least two of a compression/decompression unit (MPEG_DONE), a three-dimensional rendering unit (3D_DONE), a two-dimensional rendering unit (BLT_DONE) and a hardware binning unit (HB_DONE).

* * * * *